(12) United States Patent  (10) Patent No.: US 8,928,265 B2
Qin et al.  (45) Date of Patent: Jan. 6, 2015

(54) SENSORLESS FIELD-ORIENTED CONTROL (FOC) WITHOUT CURRENT SAMPLING FOR MOTORS

(75) Inventors: Ling Qin, Houston, TX (US); Terry L. Mayhugh, Jr., Richardson, TX (US); Swaminathan Kumar Ramanathan, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 213 days.

(21) Appl. No.: 13/572,840

(22) Filed: Aug. 13, 2012

(65) Prior Publication Data

US 2014/0042943 A1 Feb. 13, 2014

(51) Int. Cl.
H02P 6/18 (2006.01)
(52) U.S. Cl.
USPC ............. 318/400.34; 318/400.33; 318/400.02
(58) Field of Classification Search
USPC .................. 318/400.34, 400.33, 400.02, 494, 318/400.04, 807, 400.17, 805, 811, 701, 318/400.23
See application file for complete search history.

(56) References Cited

U.S. PATENT DOCUMENTS

| 5,886,498 | A | 3/1999 | Sul et al. |
|---|---|---|---|
| 7,202,629 | B2 | 4/2007 | Jadot et al. |
| 7,208,908 | B2 | 4/2007 | Anghel |
| 7,339,344 | B2 | 3/2008 | Borisavljevic |
| 7,646,164 | B2 | 1/2010 | Malrait et al. |
| 7,808,201 | B2 | 10/2010 | Borisavljevic |
| 2005/0093493 | A1 | 5/2005 | Gallagher et al. |
| 2008/0265817 | A1 | 10/2008 | Palma |
| 2010/0201298 | A1 | 8/2010 | De Filippis |
| 2011/0012544 | A1 | 1/2011 | Schulz et al. |
| 2014/0070747 | A1* | 3/2014 | Siddalingappa et al. 318/400.33 |

FOREIGN PATENT DOCUMENTS

| EP | 1758239 | 2/2007 |
|---|---|---|
| KR | 1020060022253 | 3/2006 |
| WO | WO 2006135675 | 12/2006 |

OTHER PUBLICATIONS

P.D. Chandana Perera, et al., "A Sensorless, Stable V/f Control Method for Permanent-Magnet Synchronous Motor Drives", IEEE Transactions on Industry Applications, vol. 39, No. 3, May/Jun. 2003, p. 783-791.
Jun-ichi Itoh, et al., "A Comparison between V/f Control and Position-Sensorless Vector Control for the Permanent Magnet Synchronous Motor", 2002 IEEE, p. 1310-1315.

(Continued)

*Primary Examiner* — Karen Masih
(74) *Attorney, Agent, or Firm* — Alan A. R. Cooper; Frederick J. Telecky, Jr.

(57) ABSTRACT

An apparatus includes a sensorless field-oriented control (FOC) motor controller. The motor controller includes a pulse width modulation (PWM) controller configured to generate PWM signals and to provide the PWM signals to an inverter. The motor controller also includes an angle sampler configured to receive a commanded voltage angle signal and to provide the commanded voltage angle signal as an output signal in response to a triggering event. The triggering event is based on a voltage or a current associated with an input or an output of the inverter. The motor controller further includes a first combiner configured to combine (i) a feed-forward voltage angle signal and (ii) a second signal based on the output signal. The first combiner is configured to generate the commanded voltage angle signal. In addition, the motor controller includes a second combiner configured to combine a feed-forward voltage amplitude signal and the second signal.

20 Claims, 3 Drawing Sheets

(56) References Cited

OTHER PUBLICATIONS

R. Ancuti, et al., "Sensorless V/f control of high-speed surface permanent magnet synchronous motor drives with two novel stabilising loops for fast dynamics and robustness", IET Electr. Power Appl., 2010, vol. 4, Iss. 3, p. 149-157.

Ling Qin, "Field Oriented Control of a Motor With a Single Shunt", U.S. Appl. No. 13/211,045, filed Aug. 16, 2011.

Ling Qin, "Sensorless Motor Control", U.S. Appl. No. 13/078,482, filed Apr. 1, 2011.

* cited by examiner

SENSORLESS FIELD-ORIENTED CONTROL (FOC) WITHOUT CURRENT SAMPLING FOR MOTORS

TECHNICAL FIELD

This disclosure is generally directed to motor controllers. More specifically, this disclosure is directed to sensorless field-oriented control (FOC) without current sampling for motors.

BACKGROUND

Permanent magnet synchronous motors (PMSMs), brushless direct current motors (BLDCs), switched reluctance motors, stepper motors, and induction motors represent types of motors that can be controlled using a field-oriented control (FOC) technique. These types of motors typically include a rotating rotor and a stationary stator. These motors are often powered by an inverter that converts a direct current (DC) input into an alternating current (AC) output.

In an FOC technique, various outputs of the inverter are controlled in order to adjust operation of a motor. "Sensorless" FOC refers to an approach where one or more characteristics of the motor, such as motor speed or rotor position, are derived rather than being measured directly using sensors on the motor. In some sensorless FOC techniques, the voltage on a DC bus providing the DC input to the inverter and samples of two-phase or three-phase currents provided by the inverter are used. In other sensorless FOC techniques, current on the DC bus is measured and used since the DC bus' current includes three-phase current information. As these approaches use current samples, they generally require the use of one or more analog-to-digital converters and one or more operational amplifiers to capture the current samples.

SUMMARY

This disclosure provides sensorless field-oriented control (FOC) without current sampling for motors.

In a first example, an apparatus includes a sensorless field-oriented control (FOC) motor controller. The motor controller includes a pulse width modulation (PWM) controller configured to generate PWM signals and to provide the PWM signals to an inverter. The motor controller also includes an angle sampler configured to receive a commanded voltage angle signal and to provide the commanded voltage angle signal as an output signal in response to a triggering event. The triggering event is based on a voltage or a current associated with an input or an output of the inverter. The motor controller further includes a first combiner configured to combine (i) a feed-forward voltage angle signal and (ii) a second signal based on the output signal. The first combiner is configured to generate the commanded voltage angle signal. In addition, the motor controller includes a second combiner configured to combine a feed-forward voltage amplitude signal and the second signal.

In a second example, a system includes an inverter configured to provide power to a motor and a sensorless field-oriented control (FOC) motor controller. The motor controller includes a pulse width modulation (PWM) controller configured to generate PWM signals and to provide the PWM signals to the inverter. The motor controller also includes an angle sampler configured to receive a commanded voltage angle signal and to provide the commanded voltage angle signal as an output signal in response to a triggering event. The triggering event is based on a voltage or a current associated with an input or an output of the inverter. The motor controller further includes a first combiner configured to combine (i) a feed-forward voltage angle signal and (ii) a second signal based on the output signal. The first combiner is configured to generate the commanded voltage angle signal. In addition, the motor controller includes a second combiner configured to combine a feed-forward voltage amplitude signal and the second signal.

In a third example, a method includes generating pulse width modulation (PWM) signals for an inverter that powers a motor and adjusting the generation of the PWM signals using sensorless field-oriented control. Adjusting the generation of the PWM signals includes receiving a commanded voltage angle signal associated with the motor and outputting the commanded voltage angle signal in response to a triggering event. The triggering event is based on a voltage or a current associated with an input or an output of the inverter. Adjusting the generation of the PWM signals also includes identifying an angle error using the commanded voltage angle signal. Adjusting the generation of the PWM signals further includes generating a phase angle signal of a voltage command by combining (i) a feed-forward voltage angle signal and (ii) a second signal based on the angle error. The commanded voltage angle signal represents the phase angle signal. In addition, adjusting the generation of the PWM signals includes generating a voltage signal of the voltage command by combining a feed-forward voltage amplitude signal and the second signal, where the PWM signals are generated based on the voltage command.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
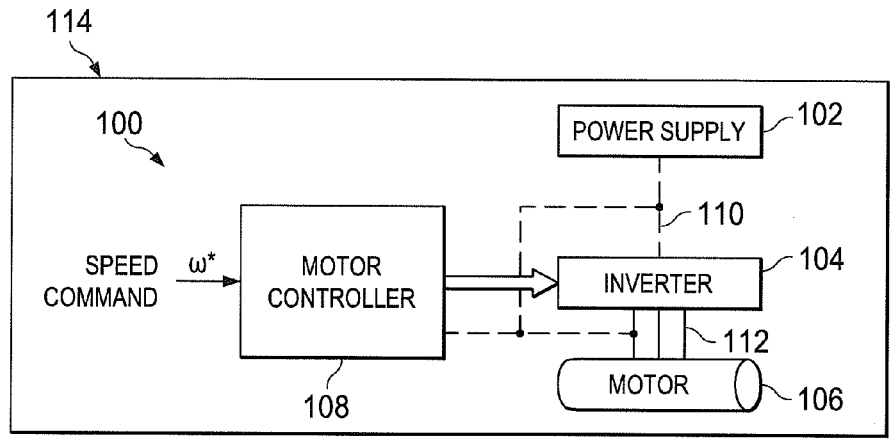
FIG. 1 illustrates an example system supporting sensorless field-oriented control (FOC) without current sampling for a motor in accordance with this disclosure.

FIG. 1 illustrates an example system 100 supporting sensorless field-oriented control (FOC) without current sampling for a motor in accordance with this disclosure. As shown in FIG. 1, the system 100 includes a power supply 102, an inverter 104, and a motor 106. The power supply 102 represents a direct current (DC) power source that provides DC power to the inverter 104. The power supply 102 includes any suitable structure for providing DC power, such as one or more batteries, fuel cells, solar cells, or other DC source(s).

The inverter 104 receives the DC power from the power source 102 and converts the DC power into an alternating current (AC) form. In this example, the inverter 104 represents a three-phase inverter that converts DC power into three-phase AC currents that are provided to the motor 106. The inverter 104 includes any suitable structure for converting power from DC form to AC form. For example, the inverter 104 could include a number of transistor switches driven using pulse width modulation (PWM) signals.

The motor 106 operates using the currents provided by the inverter 104. For example, the motor 106 can include a rotor that rotates and a stator that causes the rotor to rotate based on the currents from the inverter 104. The motor 106 includes any suitable type of motor that operates using currents from an inverter. Example motor types include permanent magnet synchronous motors, brushless direct current motors, switched reluctance motors, stepper motors, and induction motors. In particular examples, the motor 106 includes a generally straight rotor (such as a magnetic rotor) and a number of coils (such as six coils) in a stator. The coils are selectively energized and de-energized based on the currents from the inverter 104, which causes the rotor to rotate.

A motor controller 108 controls the operation of the inverter 104 to thereby control the operation of the motor 106. For example, the motor controller 108 could generate PWM signals that drive the transistor switches in the inverter 104. By controlling the duty cycles of the PWM signals, the motor controller 108 can control the currents provided by the inverter 104 to the motor 106.

In this example, the motor controller 108 receives as input a commanded speed signal $\omega^*$, which identifies a desired speed of the motor 106. The motor controller 108 may also receive as input a signal associated with DC voltage and/or DC current on a DC bus 110, which provides the DC power from the power supply 102 to the inverter 104. The motor controller 108 may further receive as input a signal associated with one of multiple current lines 112, which provide the three-phase currents from the inverter 104 to the motor 106. The motor controller 108 uses the inputs to generate PWM signals for driving the transistor switches in the inverter 104.

As described in more detail below, the motor controller 108 supports the use of sensorless field-oriented control. That is, the motor controller 108 does not receive sensor measurements from sensors mounted in or on the motor 106. Rather, the motor controller 108 infers one or more characteristics of the motor 106, such as motor speed or rotor position, using information obtained from the DC bus 110 or one or more of the current lines 112. In addition, the motor controller 108 does not require the use of current sampling of any currents in the system 100. Rather, as explained below, the motor controller 108 can use timing information associated with one or more voltages or currents, but not actual samples of any current(s), to control the motor 106.

Because of this, the motor controller 108 need not include circuitry for sampling a current. This circuitry typically includes a current sensor (such as a shunt resistor), an analog-to-digital converter, and an operational amplifier. As a result, this approach can reduce the size and cost of the motor controller 108. Additional details regarding the motor controller 108 are provided below.

The components 102-112 here could reside within or otherwise form at least a part of any suitable larger system 114 that uses one or more motors. For example, the larger system 114 could represent a vehicle that uses the motor 106 to move passengers or cargo. However, a wide variety of other systems could use motors powered by inverters, such as motors in electric scooters or bicycles, HVAC (heating, ventilation, and air conditioning) systems, pumps, actuators, and optical disc drives of computing devices or home entertainment devices.

Although FIG. 1 illustrates one example of a system 100 supporting sensorless FOC without current sampling for a motor 106, various changes may be made to FIG. 1. For example, the motor controller 108 could be coupled to one or both of the DC bus 110 and the current line(s) 112.

Figure 2:
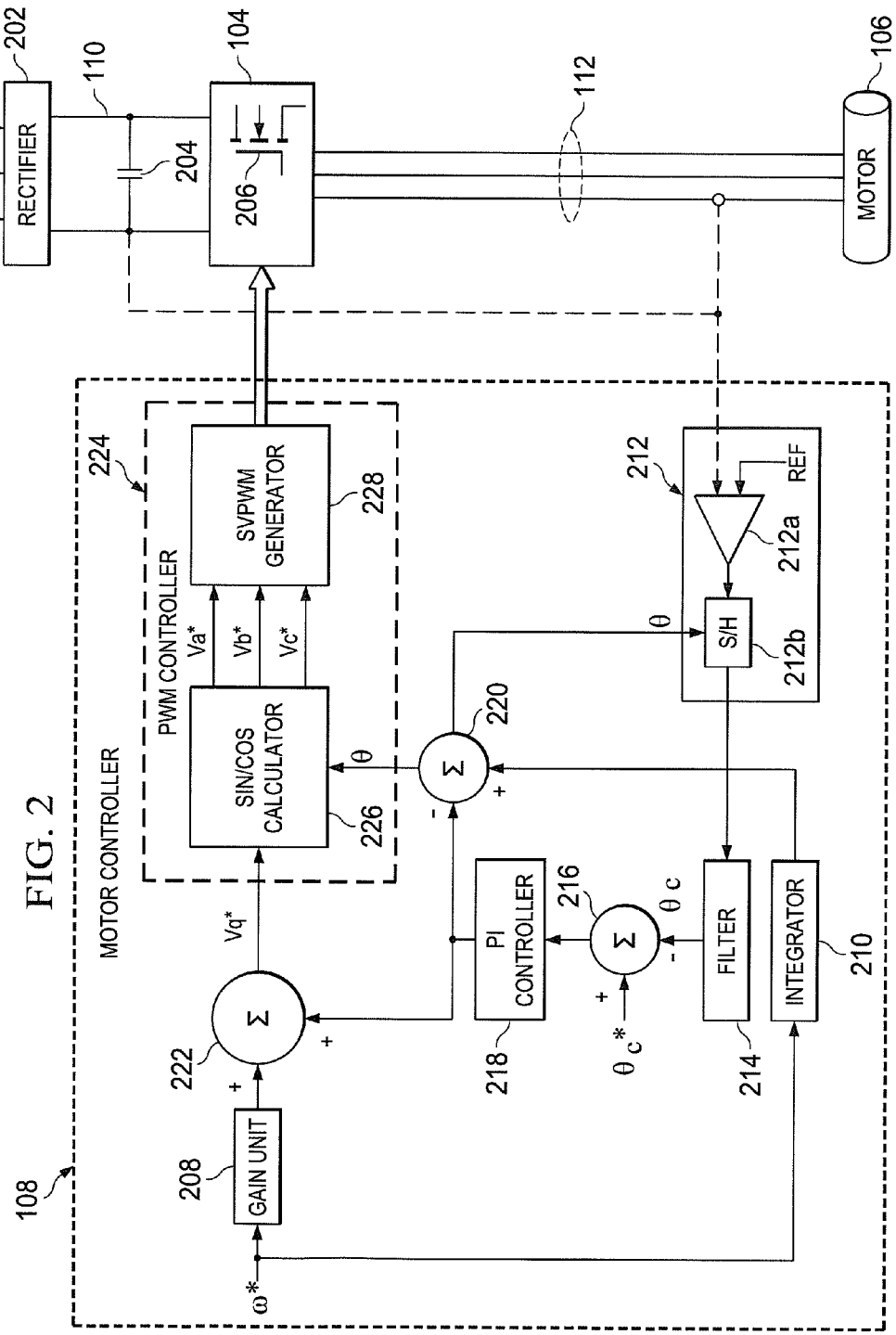
FIGS. 2 through 4 illustrate an example motor controller supporting sensorless FOC without current sampling for a motor and related details in accordance with this disclosure.
Figure 3A:
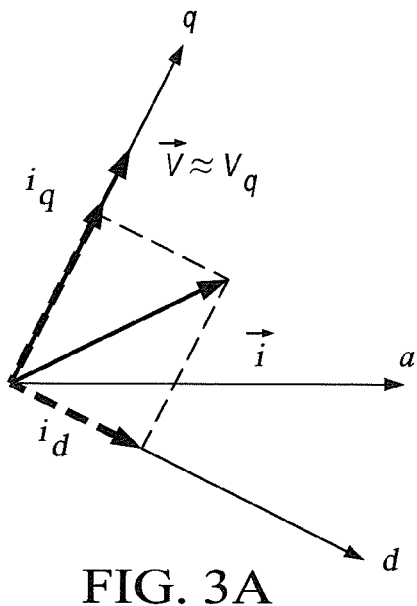
Figure 3B:
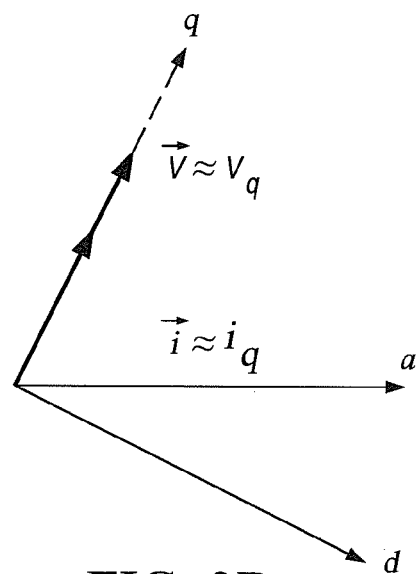
Figure 4:
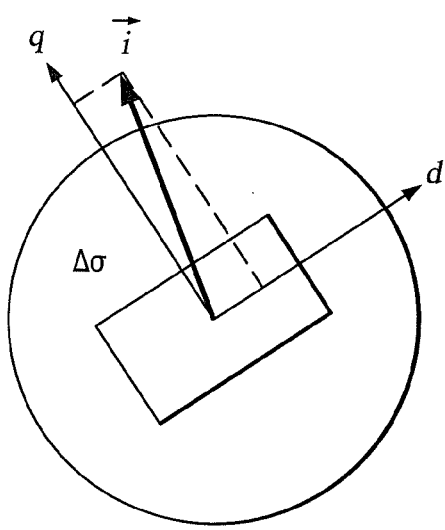

FIGS. 2 through 4 illustrate an example motor controller 108 supporting sensorless FOC without current sampling for a motor 106 and related details in accordance with this disclosure. As shown in FIG. 2, the power supply 102 in this example is implemented using a rectifier 202 and a capacitor 204. The rectifier 202 generally operates to convert AC input power into DC output power. The capacitor 204 represents an output capacitor that smoothes variations in the DC output power from the rectifier 202. The rectifier 202 includes any suitable structure for converting power from AC form to DC form. The capacitor 204 includes any suitable capacitive structure having any suitable capacitance. The inverter 104 in this example can be implemented using a number of transistor switches 206. The transistor switches 206 include any suitable transistor devices.

As shown in FIG. 2, the motor controller 108 includes a gain unit 208, which applies a gain to the commanded speed signal $\omega^*$. The gain unit 208 outputs a feed-forward (or raw commanded) voltage amplitude signal. The gain unit 208 normalizes the voltage amplitude signal according to the commanded speed signal $\omega^*$, which is often possible when a commanded voltage is approximately proportional to a commanded speed. The gain unit 208 includes any suitable structure for applying a gain to an input signal. An integrator 210 integrates the commanded speed signal $\omega^*$. An output of the integrator 210 represents a feed-forward voltage angle signal. The integrator 210 includes any suitable structure for integrating a signal.

An angle sampler 212 in the motor controller 108 can be coupled to the DC bus 110 and/or at least one of the current lines 112. The angle sampler 212 here generates an output signal that, at the occurrence of a triggering event, represents the commanded voltage angle associated with the motor 106. In particular, the angle sampler 212 can receive a continuous commanded voltage angle signal $\theta$ (from a combiner 220) that represents the voltage angle associated with the motor 106, and the voltage angle identified by the signal $\theta$ at a particular instance is output by the angle sampler 212 in response to a triggering event. The triggering event could represent a zero-crossing or a peak in the voltage or current on the DC bus 110 or on the current line 112. In this example, the angle sampler 212 can be functionally implemented as a comparator 212a and a sample and hold circuit (S/H) 212b. The comparator 212a compares the input from the DC bus 110 or current line 112 to a reference signal REF. The reference signal REF could represent a value of zero (for zero-crossing detection) or some other known value (for peak detection). When a zero-crossing or peak is detected, the comparator 212a causes the sample and hold circuit 212b to sample and output the commanded voltage angle signal $\theta$. The use of the angle sampler 212 in this manner helps to avoid the need for current sampling by the motor controller 108. The angle sampler 212 includes any suitable structure for outputting a voltage angle in response to a triggering event.

The output signal of the angle sampler 212 is provided to a filter 214, which filters the output signal and provides the filtered signal to a combiner 216. The filtered signal represents the actual voltage angle signal $\theta_c$ associated with the motor 108. The filter 214 includes any suitable structure for filtering a signal, such as a low-pass filter. The combiner 216 combines the angle signal $\theta_c$ and a reference angle signal $\theta_c^*$, which can be provided by any suitable source. The signal from the combiner 216 is an angle error signal that identifies a difference between the reference angle signal $\theta_c^*$ and the actual angle signal $\theta_c$, meaning the signal identifies the angle error. The combiner 216 includes any suitable structure for combining inputs.

The angle error is provided to a proportional-integral (PI) controller 218, which determines how to adjust operation of the motor controller 108 based on the identified angle error. In general, the PI controller 218 operates to correct the feed-forward voltage amplitude signal and the feed-forward voltage angle signal (from the gain unit 208 and the integrator 210). The PI controller 218 therefore generates a control signal that is provided to two combiners 220-222, which modify the feed-forward voltage amplitude and voltage angle signals. The PI controller 218 includes any suitable structure for providing proportional-integral control in a motor controller.

The combiner 220 combines the control signal from the PI controller 218 with the output of the integrator 210. The combiner 220 outputs a signal $\theta$, which represents the modified phase angle of the voltage command. The signal $\theta$ from the combiner 220 is provided to the angle sampler 212 as the commanded voltage angle signal and to a PWM controller 224. The combiner 222 combines the control signal from the PI controller 218 with the output of the gain unit 208. The combiner 222 outputs a voltage signal $V_q^*$ representing the modified amplitude of the voltage command. The voltage signal $V_q^*$ is provided to the PWM controller 224. Each combiner 220, 222 includes any suitable structure for combining inputs.

The PWM controller 224 receives the voltage command defined by the voltage signal $V_q^*$ from the combiner 222 and the phase angle signal $\theta$ from the combiner 220. The PWM controller 224 uses the voltage command to control the inverter 104. In this example, the PWM controller 224 includes a sine/cosine calculator 226 and a space vector PWM (SVPWM) generator 228. The sine/cosine calculator 226 uses the two inputs from the combiners 220-222 to generate three-phase voltage signals $V_a^*$, $V_b^*$, and $V_c^*$. In particular examples, the sine/cosine calculator 226 could generate the voltage signals $V_a^*$, $V_b^*$, and $V_c^*$ as follows:

$$V_a^* = -V_q^* \sin(\theta) \qquad (1)$$

$$V_b^* = -V_q^* \sin\left(\theta - \frac{2\pi}{3}\right) \qquad (2)$$

$$V_c^* = -V_q^* \sin\left(\theta + \frac{2\pi}{3}\right) \qquad (3)$$

Although these equations use only sine calculations, the calculator 226 is described as a "sine/cosine" calculator since cosine calculations could also be used.

The three-phase voltage signals define the currents to be applied during the three phases of the motor 106. The SVPWM generator 228 uses the voltage signals $V_a^*$, $V_b^*$, and $V_c^*$ to generate the PWM signals for driving the transistor switches 206 in the inverter 104. For example, the SVPWM generator 228 can adjust the duty cycles of the PWM signals based on the voltage signals $V_a^*$, $V_b^*$, and $V_c^*$.

The sine/cosine calculator 226 includes any suitable structure for identifying control voltages for different phases of a motor. In some examples, the sine/cosine calculator 226 can be implemented using a lookup table. The SVPWM generator 228 includes any suitable structure for generating PWM signals using a space-vector form of pulse width modulation.

In particular examples, various components of the motor controller 108 shown in FIG. 2 can be implemented using hardware components. In other examples, various components of the motor controller 108 shown in FIG. 2 can be implemented using software/firmware instructions embodied on at least one memory or other computer readable medium and executed by at least one processing device. In still other examples, some components of the motor controller 108 shown in FIG. 2 can be implemented using hardware components, while other components of the motor controller 108 shown in FIG. 2 can be implemented using software/firmware instructions.

In FIG. 2, the motor controller 108 supports the use of field-oriented control, which generally includes controlling the currents provided to the motor 106 while representing those currents with a vector. The motor 106, as a three-phase time-dependent and speed-dependent system, can be transformed via projection into a two-coordinate time-invariant synchronous system. The two coordinate axes are referred to as the d and q axes. In general, the behavior of a motor 106 can be modeled as follows (note that a PMSM is used as an example here):

$$V_d = i_d * R_s + L_d * pi_d - \omega * \Psi_q \qquad (4)$$

$$V_q = i_q * R_s + L_q * pi_q + \omega * \Psi_d \qquad (5)$$

$$\Psi_d = i_d * L_d + \Psi_m \qquad (6)$$

$$\Psi_q = i_q * L_q \qquad (7)$$

$\Psi_d$ and $\Psi_q$ denote flux linkages in the d and q axes, respectively, and $i_d$ and $i_q$ denote stator currents in the d and q axes, respectively. Also, $V_d$ and $V_q$ denote stator voltages in the d and q axes, respectively, and $L_d$ and $L_q$ denote stator inductances in the d and q axes, respectively. Further, $\Psi_m$ denotes flux linkage of permanent magnets in the rotor of the motor 106, and $R_s$ denotes stator resistance. In addition, $\omega$ denotes the motor's electrical angular speed, and p denotes the differential $$\frac{d}{dt}.$$

In steady state, $i_d$ and $i_q$ are DC values, so their differentials are zero. Even in a transient state, the differentials of $i_d$ and $i_q$ are still relatively small. Therefore, the following can be obtained:

$$V_d = i_d * R_s \approx 0 \qquad (8)$$

$$V_q = i_q * R_s + \omega * \Psi_m \approx \omega * \Psi_m \qquad (9)$$

$$\Psi_d \approx \Psi_m \qquad (10)$$

$$\Psi_q \approx 0 \qquad (11)$$

In steady state, the following can therefore be obtained:

$$V \approx V_q \approx \omega * \Psi_m \qquad (12)$$

Equation (12) shows that the rotor quadrant position is approximately in alignment with the resultant voltage command $\vec{V} \approx \vec{V}_q$ to properly control a motor. This provides an approximate rotor position without any complex estimator, supporting sensorless operation. Also, it is a real-time command with little or no impact due to system delay or low resolution. Without FOC, a motor vector diagram of the current vector $\vec{i}$ (which represents the current provided to the motor) may appear as shown in FIG. 3A. As shown in FIG. 3A, the current vector $\vec{i}$ extends along both axes. With FOC, the current $i_d$ is controlled to zero ($i_d=0$) and $\vec{i}=\vec{i}_q$ as shown in FIG. 3B. Given the fact that the resultant voltage vector $\vec{V}$ and the resultant current vector $\vec{i}$ approximately align to each other in FIG. 3B, the power factor is close to 1.0.

Sensorless FOC can be achieved with the motor controller 108 by controlling the angle error (as identified by the combiner 216 in FIG. 2) instead of controlling the $i_d$ and $i_q$ currents. In conventional sensorless FOC, the motor current is controlled using current samples as feedback. In FIG. 2, the angle error is controlled and is obtained using the angle sampler 212. As noted above, the angle sampler 212 identifies the angle error at zero-crossings or peak values of the phase or DC bus current or at the zero-crossings of the phase voltage.

FIG. 4 illustrates an example of controlling the angle error to a power factor equal to about 1.0. Here, $\Delta\sigma$ denotes the angle between the current vector $\vec{i}$ and the q axis. As noted above, the goal of FOC is to make $\vec{i}=\vec{i}_q$, so ideally any angle between the current vector $\vec{i}$ and the q axis is the angle error in the control of the motor 106. In reality, since the power factor can be approximately (but not exactly) 1.0 in FOC, there may always be some small non-zero angle error that is not removed in the control of the motor 106. The motor controller 108 therefore adjusts operation of the motor 106 to try and minimize the angle error.

In FIG. 4, if $\Delta\sigma>0$, it means that the voltage command for the motor 106 is leading the motor's current response. In this case, the phase angle signal θ should slow down to make the power factor closer to 1.0, and the PI controller 218 can use negative feedback to decrease the angle error. Also, if $\Delta\sigma>0$, the motor rotor lags the voltage command, and a higher-amplitude voltage signal $V_q^*$ can accelerate the motor rotor. If $\Delta\sigma<0$, the rotor is leading the commanded position, and a lower amplitude voltage signal $V_q^*$ can decelerate the rotor. Therefore, the PI controller 218 can use positive feedback to adjust the amplitude of the voltage command for the motor 106.

Although FIGS. 2 through 4 illustrate one example of a motor controller 108 supporting sensorless FOC without current sampling for a motor 106 and related details, various changes may be made to FIGS. 2 through 4. For example, the functional division shown in FIG. 2 is for illustration only. Various components in FIG. 2 could be combined, further subdivided, or omitted and additional components could be added according to particular needs. Also, the example vectors shown in FIGS. 3A, 3B, and 4 are for illustration only.

Figure 5:
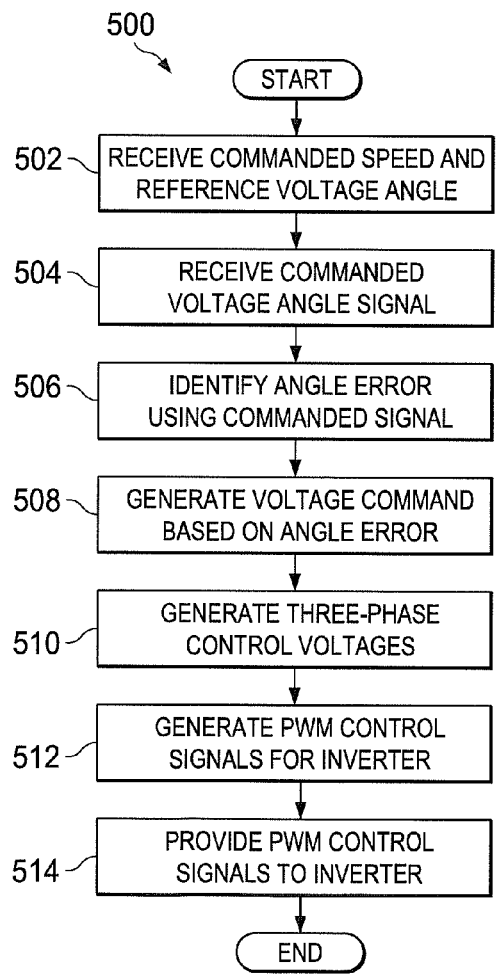
FIG. 5 illustrates an example method for sensorless FOC without current sampling for a motor in accordance with this disclosure.

FIG. 5 illustrates an example method 500 for sensorless FOC without current sampling for a motor in accordance with this disclosure. As shown in FIG. 5, a commanded speed and a reference voltage angle are received at step 502. This could include, for example, the motor controller 108 receiving a commanded speed signal ω* and a reference angle signal $\theta_c^*$ from any suitable source. A commanded voltage angle signal is also received at step 504. This could include, for example, the angle sampler 212 receiving the output (signal θ) of the combiner 220.

An angle error is identified using the commanded voltage angle signal at step 506. This could include, for example, the angle sampler 212 outputting the commanded voltage angle signal at a zero-crossing or peak value of the phase or DC bus current or at a zero-crossing of the phase voltage. This could also include the filter 214 filtering the output signal of the angle sampler 212 and the combiner 216 identifying a difference between the angle signal $\theta_c$ output by the filter 214 and the reference angle signal $\theta_c^*$.

A voltage command is generated using the angle error at step 508. This could include, for example, the PI controller 218 generating a control signal using the identified angle error. This could also include the combiner 222 modifying the feed-forward voltage amplitude signal using the control signal. The value output by the combiner 222 can represent the control voltage $V_q^*$ of the voltage command. This could further include the combiner 220 combining the control signal and the feed-forward voltage angle signal to generate the phase angle θ of the voltage command.

Three-phase control voltages are generated at step 510, and PWM signals for an inverter are generated at step 512. This could include, for example, the PWM controller 224 generating the voltage signals $V_a^*$, $V_b^*$, and $V_c^*$ using the control voltage $V_q^*$ and the phase angle θ. This could also include the PWM controller 224 generating PWM signals for the transistor switches 206 in the inverter 104 using the voltage signals $V_a^*$, $V_b^*$, and $V_c^*$. The PWM signals are provided to the inverter at step 514.

In this way, the motor controller 108 can provide sensorless FOC control for a motor 106 without requiring the use of current sampling. This can reduce the size and cost of the motor controller 108 while still achieving accurate control of the motor 106.

Although FIG. 5 illustrates one example of a method 500 for sensorless FOC without current sampling for a motor, various changes may be made to FIG. 5. For example, while shown as a series of steps, various steps in FIG. 5 could overlap, occur in parallel, occur in a different order, or occur any number of times.

While this disclosure has described certain examples and generally associated methods, alterations and permutations of these examples and methods will be apparent to those skilled in the art. Accordingly, the above description of the examples does not define or constrain this disclosure. Other changes, substitutions, and alterations are also possible without departing from the spirit and scope of this disclosure, as defined by the following claims.

What is claimed is:

1. An apparatus comprising a sensorless field-oriented control (FOC) motor controller, the motor controller comprising:
   a pulse width modulation, PWM, controller configured to generate PWM signals and to provide the PWM signals to an inverter;
   an angle sampler configured to receive a commanded voltage angle signal and to provide the commanded voltage angle signal as an output signal in response to a triggering event that is based on a voltage or a current associated with an input or an output of the inverter;
   a first combiner configured to combine (i) a feed-forward voltage angle signal and (ii) a second signal based on the output signal, the first combiner configured to generate the commanded voltage angle signal; and
   a second combiner configured to combine a feed-forward voltage amplitude signal and the second signal.

2. The apparatus of claim 1, wherein the motor controller further comprises:
   a filter configured to filter the output signal and generate a voltage angle signal; and
   a third combiner configured to combine the voltage angle signal and a reference angle signal to generate an angle error signal.

3. The apparatus of claim 2, wherein the motor controller further comprises:
a proportional-integral, PI, controller configured to receive the angle error signal and to generate the second signal using the angle error signal.

4. The apparatus of claim 1, wherein the motor controller further comprises:
a gain unit configured to apply a gain to a commanded speed signal and to generate the feed-forward voltage amplitude signal.

5. The apparatus of claim 1, wherein the triggering event comprises a zero-crossing or a peak in the voltage or the current on the input or the output of the inverter.

6. The apparatus of claim 1, wherein the PWM controller comprises:
a sine/cosine calculator configured to generate three-phase control voltages using a voltage signal output by the second combiner and a phase angle signal output by the first combiner; and
a space vector PWM, SPVWM, generator configured to generate the PWM signals using the three-phase control voltages.

7. The apparatus of claim 1, wherein the PWM generator, the angle sampler, and the combiners comprise hardware modules.

8. The apparatus of claim 1, wherein the PWM generator, the angle sampler, and the combiners comprise software or firmware modules embodied on at least one non-transitory computer readable medium.

9. A system comprising:
an inverter configured to provide power to a motor; and
a sensorless field-oriented control FOC, motor controller comprising:
a pulse width modulation, PWM, controller configured to generate PWM signals and to provide the PWM signals to the inverter;
an angle sampler configured to receive a commanded voltage angle signal and to provide the commanded voltage angle signal as an output signal in response to a triggering event that is based on a voltage or a current associated with an input or an output of the inverter;
a first combiner configured to combine (i) a feed-forward voltage angle signal and (ii) a second signal based on the output signal, the first combiner configured to generate the commanded voltage angle signal; and
a second combiner configured to combine a feed-forward voltage amplitude signal and the second signal.

10. The system of claim 9, wherein the motor controller further comprises:
a filter configured to filter the output signal and generate a voltage angle signal; and
a third combiner configured to combine the voltage angle signal and a reference angle signal to generate an angle error signal.

11. The system of claim 10, wherein the motor controller further comprises:
a proportional-integral, PI, controller configured to receive the angle error signal and to generate the second signal using the angle error signal.

12. The system of claim 11, wherein the motor controller further comprises:
a gain unit configured to apply a gain to a commanded speed signal and to generate the feed-forward voltage amplitude signal.

13. The system of claim 12, wherein the triggering event comprises a zero-crossing or a peak in the voltage or the current on the input or the output of the inverter.

14. The system of claim 13, wherein the PWM controller comprises:
a sine/cosine calculator configured to generate three-phase control voltages using a voltage signal output by the second combiner and a phase angle signal output by the first combiner; and
a space vector PWM, SVPWM, generator configured to generate the PWM signals using the three-phase control voltages.

15. The system of claim 14, further comprising:
a vehicle that includes the motor, the inverter, and the motor controller.

16. A method comprising:
generating pulse width modulation, PWM, signals for an inverter that powers a motor; and
adjusting the generation of the PWM signals using sensorless field-oriented control by:
receiving a commanded voltage angle signal associated with the motor;
outputting the commanded voltage angle signal in response to a triggering event, the triggering event based on a voltage or a current associated with an input or an output of the inverter;
identifying an angle error using the commanded voltage angle signal;
generating a phase angle signal of a voltage command by combining (i) a feed-forward voltage angle signal and (ii) a second signal based on the angle error, the commanded voltage angle signal comprising the phase angle signal; and
generating a voltage signal of the voltage command by combining a feed-forward voltage amplitude signal and the second signal, the PWM signals generated based on the voltage command.

17. The method of claim 16, wherein adjusting the generation of the PWM signals further comprises:
filtering the outputted commanded voltage angle signal to generate a voltage angle signal; and
combining the voltage angle signal and a reference angle signal to generate an angle error signal.

18. The method of claim 17, wherein adjusting the generation of the PWM signals further comprises:
generating the second signal with a proportional-integral (PI) controller using the angle error signal.

19. The method of claim 16, further comprising:
applying a gain to a commanded speed signal to generate the feed-forward voltage amplitude signal.

20. The method of claim 16, wherein generating the PWM signals comprises:
generating three-phase control voltages using the voltage command; and
generating the PWM signals using the three-phase control voltages.

* * * * *